United States Patent
Johnson et al.

(10) Patent No.: US 11,263,612 B2
(45) Date of Patent: Mar. 1, 2022

(54) SYSTEMS AND METHODS FOR POINT OF SALE DATA SYNCHRONIZATION

(71) Applicant: Aptos, Inc., Atlanta, GA (US)

(72) Inventors: David Johnson, Boulder, CO (US); Terry Bissonnette, New Hope, PA (US)

(73) Assignee: APTOS, Inc., Atlanta, GA (US)

( * ) Notice: Subject to any disclaimer, the term of this patent is extended or adjusted under 35 U.S.C. 154(b) by 510 days.

(21) Appl. No.: 15/967,010

(22) Filed: Apr. 30, 2018

(65) Prior Publication Data

US 2018/0315035 A1 Nov. 1, 2018

Related U.S. Application Data

(60) Provisional application No. 62/491,763, filed on Apr. 28, 2017.

(51) Int. Cl.
*G06Q 20/20* (2012.01)
*H04L 67/1042* (2022.01)
*H04L 67/02* (2022.01)
*H04L 67/101* (2022.01)
*H04L 61/4511* (2022.01)
*H04L 61/4541* (2022.01)

(52) U.S. Cl.
CPC .......... *G06Q 20/202* (2013.01); *H04L 67/02* (2013.01); *H04L 67/1051* (2013.01); *H04L 61/1511* (2013.01); *H04L 61/1541* (2013.01); *H04L 67/101* (2013.01)

(58) Field of Classification Search
CPC .................................................. G06Q 20/20
USPC .......................................................... 705/21
See application file for complete search history.

(56) References Cited

U.S. PATENT DOCUMENTS

| | | | | |
|---|---|---|---|---|
| 7,805,334 | B1 * | 9/2010 | Huppert | G06Q 20/20 705/16 |
| 8,719,103 | B2 * | 5/2014 | Bouaziz | G06Q 20/20 705/17 |
| 9,672,572 | B2 * | 6/2017 | Lehnert | G06Q 20/322 |
| 10,003,642 | B2 * | 6/2018 | Vandwalle | H04W 56/0015 |
| 10,068,218 | B2 * | 9/2018 | Abraham | G07G 1/14 |
| 10,318,546 | B2 * | 6/2019 | Gupta | G06Q 20/4016 |
| 10,580,029 | B2 * | 3/2020 | Beatty | G06Q 30/0238 |
| 2002/0156704 | A1 * | 10/2002 | Koi | G06Q 30/02 705/26.1 |

(Continued)

OTHER PUBLICATIONS

Buecker, Axel, "IBM System z in a Mobile World: Providing Secure and Timely Mobile Access to the Mainframe" Nov. 26, 2014, Redbooks, ISBN: 9780738440095 (Year: 2014).*

(Continued)

*Primary Examiner* — Oluseye Iwarere
*Assistant Examiner* — Seye Iwarere
(74) *Attorney, Agent, or Firm* — Morris, Manning & Martin, LLP; Daniel E. Sineway, Esq.

(57) ABSTRACT

The present disclosure relates generally to providing a mechanism for communication between point of sale devices. Using network technology and novel processes, the present systems and methods can share transaction records among multiple devices without the presence of a physical server. For example, in certain embodiments, the present systems and methods leverage virtual server technology to implement local area networks of point of sale devices with zero configuration.

10 Claims, 6 Drawing Sheets

EXEMPLARY SYSTEM ENVIRONMENT

(56) References Cited

U.S. PATENT DOCUMENTS

| | | | |
|---|---|---|---|
| 2003/0208560 A1* | 11/2003 | Inoue | G06Q 30/0207 709/219 |
| 2004/0128199 A1* | 7/2004 | Cusack | G06Q 20/20 705/16 |
| 2007/0100696 A1* | 5/2007 | Illingworth | G06Q 30/0268 705/14.65 |
| 2011/0125566 A1* | 5/2011 | McLaughlin | G06Q 30/0222 705/14.23 |
| 2012/0330769 A1* | 12/2012 | Arceo | G06Q 20/4014 705/21 |
| 2013/0005331 A1* | 1/2013 | Turgeman | H04W 4/029 455/426.1 |
| 2013/0054396 A1* | 2/2013 | Goldfinger | G06Q 20/209 705/21 |
| 2013/0132500 A1* | 5/2013 | Vandwalle | H04L 67/104 709/208 |
| 2013/0144701 A1* | 6/2013 | Kulasooriya | G06Q 20/202 705/14.24 |
| 2013/0159120 A1* | 6/2013 | Cao | G06Q 20/202 705/21 |
| 2013/0325525 A1* | 12/2013 | Boyd, Jr. | G06Q 10/02 705/5 |
| 2014/0207597 A1* | 7/2014 | Bouaziz | G06Q 20/322 705/21 |
| 2014/0372198 A1* | 12/2014 | Goldfinger | G06Q 30/0201 705/14.33 |
| 2015/0006633 A1* | 1/2015 | Vandwalle | H04L 67/1051 709/204 |
| 2015/0046240 A1* | 2/2015 | Moreton | G06Q 30/0225 705/14.17 |
| 2015/0088676 A1* | 3/2015 | Elliott | G06Q 20/29 705/21 |
| 2015/0100152 A1* | 4/2015 | Barragan Trevino | G06Q 20/322 700/232 |
| 2015/0195162 A1* | 7/2015 | Gandham | H04L 43/067 709/206 |
| 2015/0205573 A1* | 7/2015 | Kaplan | G06F 3/0482 700/94 |
| 2015/0206122 A1* | 7/2015 | Elliott | G06F 16/9554 705/21 |
| 2015/0269683 A1* | 9/2015 | Lehnert | G06Q 40/12 705/30 |
| 2015/0379496 A1* | 12/2015 | Kulasooriya | G06Q 30/0253 705/14.51 |
| 2016/0005020 A1* | 1/2016 | Fernando | G07G 1/14 705/21 |
| 2016/0019536 A1* | 1/2016 | Ortiz | G06Q 20/3227 705/67 |
| 2016/0034876 A1* | 2/2016 | Speiser | G06Q 20/223 705/21 |
| 2016/0125449 A1* | 5/2016 | Beatty | G06Q 20/202 705/14.38 |
| 2016/0140460 A1* | 5/2016 | Boyd, Jr. | G06Q 30/0641 705/5 |
| 2016/0227463 A1* | 8/2016 | Baligh | H04W 40/16 |
| 2017/0178104 A1* | 6/2017 | Fernandez | H04W 4/33 |
| 2017/0230236 A1* | 8/2017 | Kim | H04L 7/0008 |
| 2017/0272316 A1* | 9/2017 | Johnson | H04L 67/141 |
| 2017/0311359 A1* | 10/2017 | Cho | H04W 4/80 |
| 2017/0323704 A1* | 11/2017 | Ovalle | G07F 17/3218 |
| 2017/0344971 A1* | 11/2017 | Kargman | G06Q 20/201 |
| 2017/0364886 A1* | 12/2017 | Barragan Trevino | G06Q 20/322 |
| 2018/0081955 A1* | 3/2018 | Gupta | G06Q 20/389 |
| 2018/0121158 A1* | 5/2018 | Hinokio | H04R 3/12 |
| 2018/0315035 A1* | 11/2018 | Johnson | H04L 67/1051 |
| 2019/0080421 A1* | 3/2019 | McLaughlin | G06Q 50/01 |
| 2019/0385137 A1* | 12/2019 | Barragan Trevino | G05B 15/02 |

OTHER PUBLICATIONS

C. J. Debono and D. Busuttil, "A secure wireless point of sale system," 2011 IEEE EUROCON—International Conference on Computer as a Tool, 2011, pp. 1-4, doi: 10.1109/EUROCON.2011.5929195. (Year: 2011).*

\* cited by examiner

FIG. 1: EXEMPLARY SYSTEM ENVIRONMENT

FIG. 2: EXEMPLARY MASTER ELECTION FLOW CHART

FIG. 3: EXEMPLARY MASTER DATA SYNCHRONIZATION

FIG. 4: EXEMPLARY TREE DATA STRUCTURE DIAGRAM

FIG. 5: EXEMPLARY SERVICE DISCOVERY PROTOCOL

FIG. 6: EXEMPLARY TRANSACTION DATA SYNCHRONIZATION FLOW CHART

SYSTEMS AND METHODS FOR POINT OF SALE DATA SYNCHRONIZATION

CROSS REFERENCE TO RELATED APPLICATIONS

This application claims priority to, the benefit under 35 U.S.C. § 119 of, and incorporates by reference herein in its entirety U.S. Provisional Patent Application No. 62/491,763, filed Apr. 28, 2017, and entitled "Systems and Methods for Point of Sale Data Synchronization."

TECHNICAL FIELD

The present systems and methods relate generally to synchronizing point of sale data and systems in commercial establishments, and more particularly to systems and methods for synchronizing point of sale data across multiple devices without the use of a central server.

BACKGROUND

A retail store point of sale ("POS") system is a highly distributed system operating over a wide area network connecting retail stores to corporate data systems. A customer's interaction in the store at the point of sale needs to be as smooth as possible in order to ensure the highest level of customer experience. The reliability of the network connectivity between stores and external data sources (e.g., corporate headquarters) can vary substantially from one retailer to another or within a retailer based on the geography and capabilities of available data networks.

Traditionally, in-store systems included one or more in-store servers and one or more store devices. The devices in stores are generally traditional point of sale devices (e.g., desktop computers). These devices would electronically communicate to a store server, operating as a bridge between the wide area (corporate) network and the local area (store) network. The store server would both retrieve master data from the external data sources as well serve as a collection point for financial transactions to later be transmitted to the external data system for auditing and analysis. The challenge with this architecture, however, is the long term cost to own and operate such systems. Each end point in the store has to be secured, updated, and maintained which presents retailers with various challenges.

Virtually every retailer needs a high performing and highly reliable system which can operate quickly with or without a network connection to the corporate systems. Therefore, there exists a long felt but unresolved need for systems and methods that allow for POS systems to be centrally managed, have real-time access to key data, and operate offline without the use of a physical, in-store server.

BRIEF SUMMARY OF THE DISCLOSURE

According to various aspects of the present disclosure, and in one embodiment, the present systems and methods allow for the synchronization of point of sale data and devices in a communications network in both online and offline environments. In traditional point of sale systems, various POS devices are connected over a network to an "edge server". In particular embodiments, the various devices may be computers, cash registers, etc., and the edge server is operable to receive data from these devices (such as transaction and payment information). In certain embodiments, the edge server may further transmit this data to a data center, or any appropriate large scale storage entity, for further processing and/or analysis. According to various aspects of the present disclosure, the present system eliminates the need for an edge server in a communications networks (e.g., a retailer network), as well as provides many benefits over previous systems. Throughout the disclosure, the terms "client" and "point of sale" (or "POS") device are used interchangeably. It should be understood that these terms are intended to represent a device within a network operable to transmit and receive wired or wireless electronic communications in connection with processing point of sale transactions, such as purchases of goods and services.

In various embodiments, the present system includes one or more POS devices, each device operable to communicate with a virtual server (e.g., cloud-based architecture). In one embodiment, the system employs a virtual, document-oriented architecture and database system (e.g., Couchbase®, MongoDB®, CouchDB®, etc.) to receive, store, and analyze data from the one or more point of sale devices. In some embodiments, the one or more point of sale devices may be tablet computers (e.g., iPads®), desktop computers, smartphones, or any appropriate device capable of executing various business transactions. The one or more point of sale devices may execute software corresponding to the cloud-based architecture, such as the mobile application engine Couchbase Lite®, wherein the mobile application engine allows seamless communication between the point of sale devices and the cloud-based architecture.

According to various aspects of the present disclosure, and as will be discussed in greater detail below, the one or more point of sale devices form a peer-to-peer network at the point of sale location, wherein one of the point of sale devices is determined to be a master point of sale device by means of a leader election algorithm. In one embodiment, the master point of sale device transmits and receives data to and from a gateway module within the virtual architecture, and then further facilitates an update/sharing process among the other point of sale devices in the network. In a particular embodiment, the update/sharing process among the point of sale devices in the network may occur while the point of sale devices are offline and not connected to the virtual architecture. In one embodiment, and upon becoming reconnected to the virtual architecture, the master point of sale device may synchronize data between the virtual architecture and the peer-to-peer network at the point of sale location.

According to particular embodiments, a system for facilitating data communication between point of sale ("POS") devices, including: a plurality of POS devices deployed at a retail location and operative to process transactions relating to purchase of goods/services at the retail location, wherein one of the plurality of POS devices comprises a master POS device that coordinates transaction data corresponding to the purchase of goods/services from the plurality of POS devices to a central server located at a disparate physical location from the retail location; and the central server operative to communicate with the master POS device, wherein the master POS device is designated from the plurality of POS devices via a master election algorithm, the master election algorithm including the following steps: 1) retrieving one or more preferences corresponding to election of the master POS device; 2) scanning each of the plurality of POS devices to identify at least one POS device matching the one or more preferences; and 3) designating the at least one POS device as the master POS device.

In particular embodiments, the system herein, wherein the central server is operative to receive transaction data from the master POS device. In at least one embodiment, the system herein, wherein the master POS device is operable to receive data from the central server, stores it in local memory within the master POS device, and propagate it to the plurality of POS devices. In some embodiments, the system herein, wherein each of the plurality of POS devices has installed thereon a software agent comprising an HTTP listener that detects data updates within any of the plurality of POS devices. According to one or more embodiments, the system herein, wherein each of the plurality of POS devices replicates its respective transaction data to at least one other POS device for purposes of data redundancy. According to some embodiments, the system herein, wherein data replication is performed during an offline mode when at least one of the plurality of POS devices is disconnected from a network connection. In various embodiments, the system herein, wherein the plurality of POS devices are organized into a hierarchical tree structure of devices comprising the master POS device at a root of the tree structure, whereby data is propagated and replicated along the tree structure. In particular embodiments, the system herein, wherein each of the plurality of POS devices is able to communicate with all POS devices in the plurality of POS devices. In certain embodiments, the system herein, wherein the one or more preferences corresponding to election of the master POS device are selected from the group comprising: available bandwidth, available storage memory, network connection strength, processing capabilities, age of device, device type, a preordered list of devices. In at least one embodiment, the system herein, wherein the plurality of POS devices are selected from the group comprising: cash registers, tablet computers, desktop computers, smartphones, and/or any of the foregoing having a dongle that enables payment transaction processing.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

According to various aspects of the present disclosure, and in one embodiment, the present systems and methods allow for the synchronization of point of sale data and devices in a communications network in both online and offline environments. In traditional point of sale systems, various POS devices are connected over a network to an "edge server". In particular embodiments, the various devices may be computers, cash registers, etc., and the edge server is operable to receive data from these devices (such as transaction and payment information). In certain embodiments, the edge server may further transmit this data to a data center, or any appropriate large scale storage entity, for further processing and/or analysis. According to various aspects of the present disclosure, the present system eliminates the need for an edge server in a communications networks (e.g., a retailer network), as well as provides many benefits over previous systems.

In various embodiments, the present system includes one or more POS devices, each device operable to communicate with a virtual server (e.g., cloud-based architecture). In one embodiment, the system employs a virtual, document-oriented architecture and database system (e.g., Couchbase®, MongoDB®, CouchDB®, etc.) to receive, store, and analyze data from the one or more point of sale devices. In some embodiments, the one or more point of sale devices may be tablet computers (e.g., iPads®), desktop computers, smartphones, or any appropriate device capable of executing various business transactions. The one or more point of sale devices may execute software corresponding to the cloud-based architecture, such as the mobile application engine Couchbase Lite®, wherein the mobile application engine allows seamless communication between the point of sale devices and the cloud-based architecture.

According to a particular embodiment, the mobile application engine includes an HTTP listener. In particular embodiments, an HTTP listener is operable to monitor HTTP activity and requests within a network. According to various aspects of the present disclosure, the HTTP listener exposes a REST API, which allows for the system to detect text manipulation and updates within the system (e.g., new transaction data stored within the system).

In one embodiment, the mobile application engine supports push replication, wherein a client (point of sale device) may make an HTTP request to a listener to push changed documents. In certain embodiments, the mobile application engine also supports pull replication, wherein a client makes an HTTP request to pull changed documents. In various embodiments, replication can be continuous (using web socket or long-polling) or "one-shot".

According to various aspects of the present disclosure, and as will be discussed in greater detail below, the one or more point of sale devices form a peer-to-peer network at the point of sale location, wherein one of the point of sale devices is determined to be a master point of sale device by means of a leader election algorithm. In one embodiment, the master point of sale device transmits and receives data to and from a gateway module within the virtual architecture, and then further facilitates an update/sharing process among the other point of sale devices in the network. In a particular embodiment, the update/sharing process among the point of sale devices in the network may occur while the point of sale devices are offline and not connected to the virtual architecture. In one embodiment, and upon becoming reconnected to the virtual architecture, the master point of sale device may synchronize data between the virtual architecture and the peer-to-peer network at the point of sale location.

In one embodiment, the virtual architecture includes a gateway module, such as the Couchbase® Sync Gateway. In a particular embodiment, the gateway module may maintain up-to-date copies of various documents and other data, as well as regulate the access of data between the various POS devices and the virtual architecture.

Exemplary Embodiments

Figure 1:
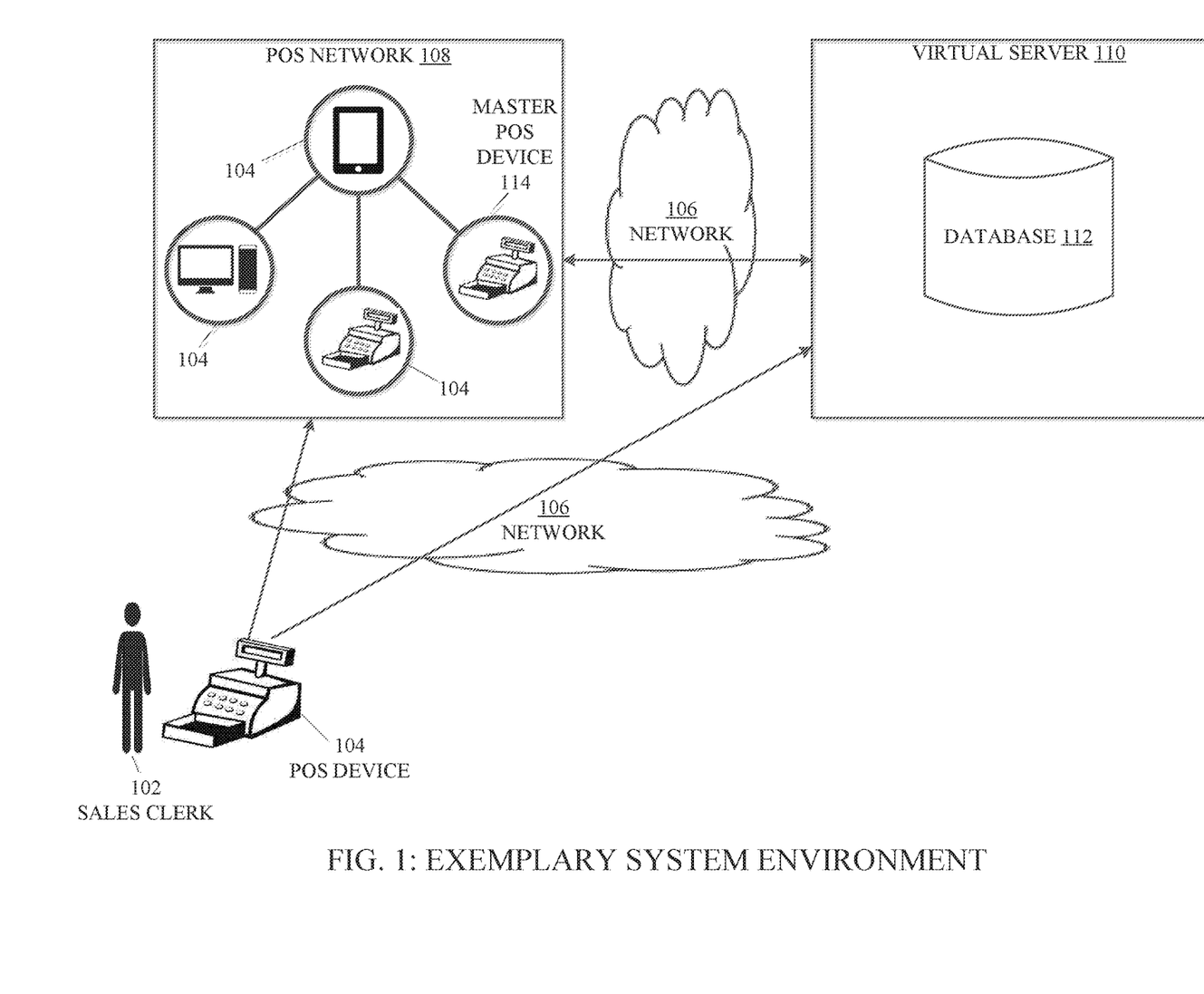
FIG. 1 illustrates an exemplary system environment, according to one embodiment of the present disclosure.

Referring now to the figures, for the purposes of example and explanation of the fundamental processes and components of the disclosed systems and methods, reference is made to FIG. 1, which illustrates an exemplary, high-level overview of one embodiment of the systems and methods herein. As will be understood and appreciated, the exemplary, high-level overview shown in FIG. 1 represents merely one approach or embodiment of the present system, and other aspects are used according to various embodiments of the present system. In particular, FIG. 1 depicts a particular example in which a sales clerk 102 enters a transaction on a POS device 104, the transaction is recorded in a virtual server 110, and the transaction is shared with other devices on a POS network 108. Further, FIG. 1 depicts how various systems in this environment interact in at least one embodiment of the systems and methods described herein.

As shown in FIG. 1, a sales clerk 102 uses a point of sale device 104 to record a customer transaction (e.g., purchase, return, etc.). The POS device 104 is part of a larger POS network 108 that may include a master POS device 114 and one or more other POS devices 104. In various embodiments, the master device 114 can be any POS device in the POS network. The POS network 108, in the embodiment shown, is operatively connected to a virtual server 110 (e.g., cloud-based architecture) that includes at least one database 112. Further, as shown, the various components of this exemplary environment are operatively connected via one or more networks 106.

In one embodiment, the network 106 may be, but is not limited to, the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hosts, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

Assume, as a discussion example, that the sales clerk 102 is processing a credit card transaction for a customer that is purchasing apparel. The sales clerk is using a POS device 104 operatively connected to a POS network 108. As will be understood by a person of ordinary skill in the art, a POS device is an electronic device used to process payments at retail locations. Generally, a POS device can process credit cards and debit cards, track customer orders, and manage inventory among other tasks.

Prior to the sales clerk processing the customer's apparel transaction, in this particular example, the pricing information should be current and the store inventory should reflect current inventory levels. To ensure this, the master POS device 114 pulls the most current inventory and pricing information from the database 112 on the virtual server 110, and shares that information with every other device on the POS network 108, including POS device 104.

Continuing with the present example, in the event the sales clerk 102 needs to suspend the current transaction because the customer wants to continue shopping and select additional items, or for any other reason, the POS device 104 may replicate the customer's transaction across each device in the POS network, such that the customer can continue the transaction at any other POS device on the network 108. The system's ability to self-replicate within the POS network 108 facilitates data redundancy and increases resiliency in the event of disruptions to any one or more POS devices 104. As will be understood from the discussions herein, the above particular example is merely exemplary functionality of the systems and methods described herein. For example, the above describes a sales clerk processing a payment transaction for a customer purchasing apparel, but the systems and methods herein may be useful for any use in connection with point of sale transaction processing across a wide area network of point of sale devices.

Master Election

In one embodiment, the one or more POS devices in a POS network 108 "elect" one of the POS devices to be the master POS device 114. In certain embodiments, the master POS device receives and transmits data (using push and pull replication as described herein) to and from the virtual server 110.

Figure 2:
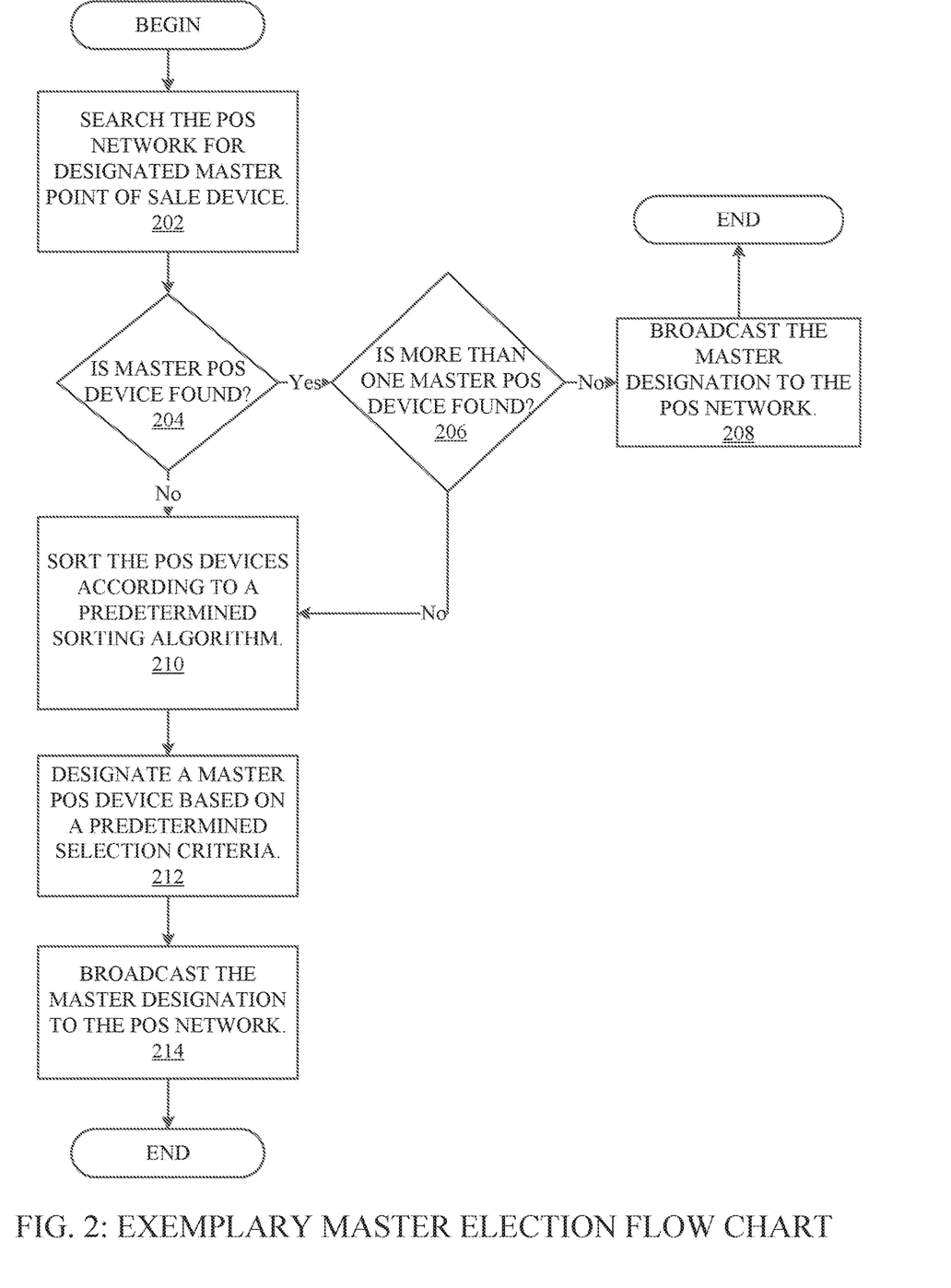
FIG. 2 illustrates an exemplary flowchart of an exemplary process for the election of a master point of sale device, according to one embodiment of the present disclosure.

FIG. 2 illustrates an exemplary flowchart of an exemplary process for the election of a master point of sale device, according to one embodiment of the present disclosure. In one embodiment, the process for the election of a master POS device 114 is initiated when a POS device 104 is discovered to have joined the POS network 108. In another embodiment, the process for the election of a master POS device 114 is initiated when a POS device 104 is discovered to have disconnected from the POS network 108. In various embodiments, the process for the election of a master POS device is executed by any or all POS devices 104 on a POS network 108. In particular embodiments, the process for the election of a mater POS device is executed by the virtual server 110. In some embodiments, the process for the election of a master POS device 114 may be executed by the last known master POS device on the POS network 108. As will be understood by a person having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

In one embodiment, and as shown in FIG. 2, the exemplary process begins with step 202, in which the system searches the POS network 108 for a designated master point of sale device. In various embodiments, the system is configured to perform a linear search of the POS network. In particular embodiments, the system may be configured to perform a binary search, or any other suitable search of the POS network 108 (e.g., a tree search, a Fibonacci search, etc.).

At step 204, the system is configured to perform a check to determine whether a master POS device 114 was found at step 202. In one embodiment, if a master POS device was found, at step 206 the system performs an additional check to determine whether more than one master POS devices were found in the POS network 108. If only one master POS device was found, then at step 208, in particular embodiments, the system is configured to broadcast the master designation to the POS network and the exemplary process terminates.

However, in various embodiments, if more than one master POS device was found at step 206, or no master POS device 114 was found at step 204, then at step 210 the system is configured to sort the POS devices in the POS network 108 according to a predetermined sorting algorithm. In one embodiment, the system may sort the POS devices via a comparison sorting algorithm (e.g., merge sort, insertion sort, etc.). In another embodiment, the system may sort the devices via an integer sorting algorithm (e.g., counting sort, alphabetically according to the device identification numbers, etc.). At step 212, in particular embodiments, the system designates a POS device to be the master POS device 114 in the POS network 108 based on a predetermined selection criteria. In one embodiment, the selection criteria may include positioning resulting from the sort conducted in step 210. In another embodiment, the selection criteria may include technical factors and POS device capabilities, such as memory size, upstream/downstream bandwidth capabilities, and processor speeds.

In various embodiments, the system is configured to terminate after step 214, in which the system broadcasts the master designation to the POS network 108. In at least one embodiment, upon election of a master POS device 114, the system initiates a master data sync followed by peer replication (pull) as described herein.

Master Data Sync

Figure 3:
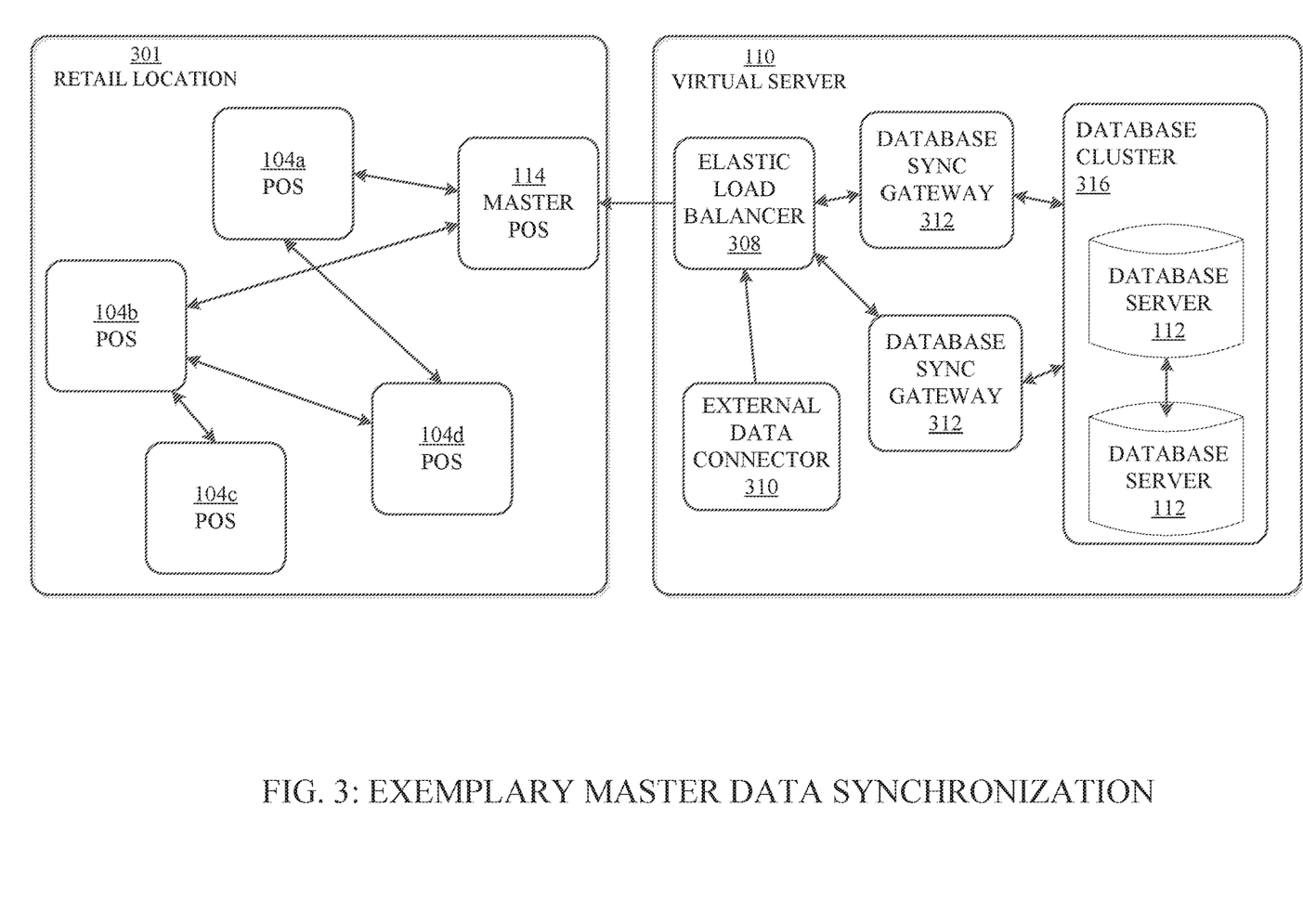
FIG. 3 illustrates an exemplary master data synchronization diagram, according to one embodiment of the present disclosure.

FIG. 3 illustrates an exemplary master data synchronization diagram, according to one embodiment of the present disclosure. In various embodiments, master data is data associated with product information, pricing, tax information, coupon information, etc. In one embodiment, the master data includes configuration information that may drive the customization of a user interface ("UP") and business rules at a point of sale device. As understood, a business rule is a configuration setting that influences business behavior (e.g., a floor limit for requiring offline payments). In particular embodiments, having a copy of the master data at point of sale devices allows for the point of sale devices to facilitate and process offline transactions (such as scanning a basket of items and completing a sale).

According to various aspects of the present disclosure, master data is stored in the virtual server 110 and transmitted to a master point of sale device 114 during a master data sync. In one embodiment, the master data sync includes replicating master data from the virtual server to the one or more point of sale devices, without the use of an in-store (edge) server.

As shown in FIG. 3, the one or more point of sale devices 114, 104a, 104b, 104c, and 104d in an exemplary retail location 301 are in operable communication with each other (e.g., in a peer-to-peer network), and one point of sale device is indicated as the master point of sale device 114. In the present embodiment, the master point of sale device is operatively connected to a virtual server 110. In various embodiments, the virtual server may include a database cluster 316 with database servers 112 for storing data, database synchronization ("sync") gateways 312 for transferring data to and from the database servers, an elastic load balancing module ("ELB") 308 for dynamic data transfer to the master POS device 114, and an external data connector 310 for populating data into the database cluster 316 so it can be replicated to the POS devices 104.

In particular embodiments, the master POS device 114 may receive data from the ELB module 308. In some embodiments, elastic load balancing allows for the cloud-based architecture to dynamically adjust to high traffic without compromising fault tolerance. In particular embodiments, the master POS device 114 may receive master data directly from the database synchronization gateways 312 without the need for the ELB module 114. In certain embodiments, the virtual server 110 replicates the master data and transmits the data to the master POS device 114. In various embodiments, the replication process may be one-way or bi-directional, as appropriate for various system configurations.

Sync Gateway Replication

In various embodiments, once a master POS device 114 is elected, it may initiate continuous pull replication with the database synchronization gateway module 312 to receive documents, or only document changes, from the virtual server 110 that may include the item catalog, pricing, tax calculation information, promotions, user accounts, configuration settings, retail location settings, etc. According to various aspects of the present disclosure, the result of the sync gateway 312 replication is that any pertinent changes in master data are replicated and transmitted to the master POS device. In one embodiment, the master POS device 114 may initiate pull replication any time a document change is detected. In another embodiment, the master POS device may initiate pull replication at set intervals.

Peer Selection (Master Data)

Figure 4:
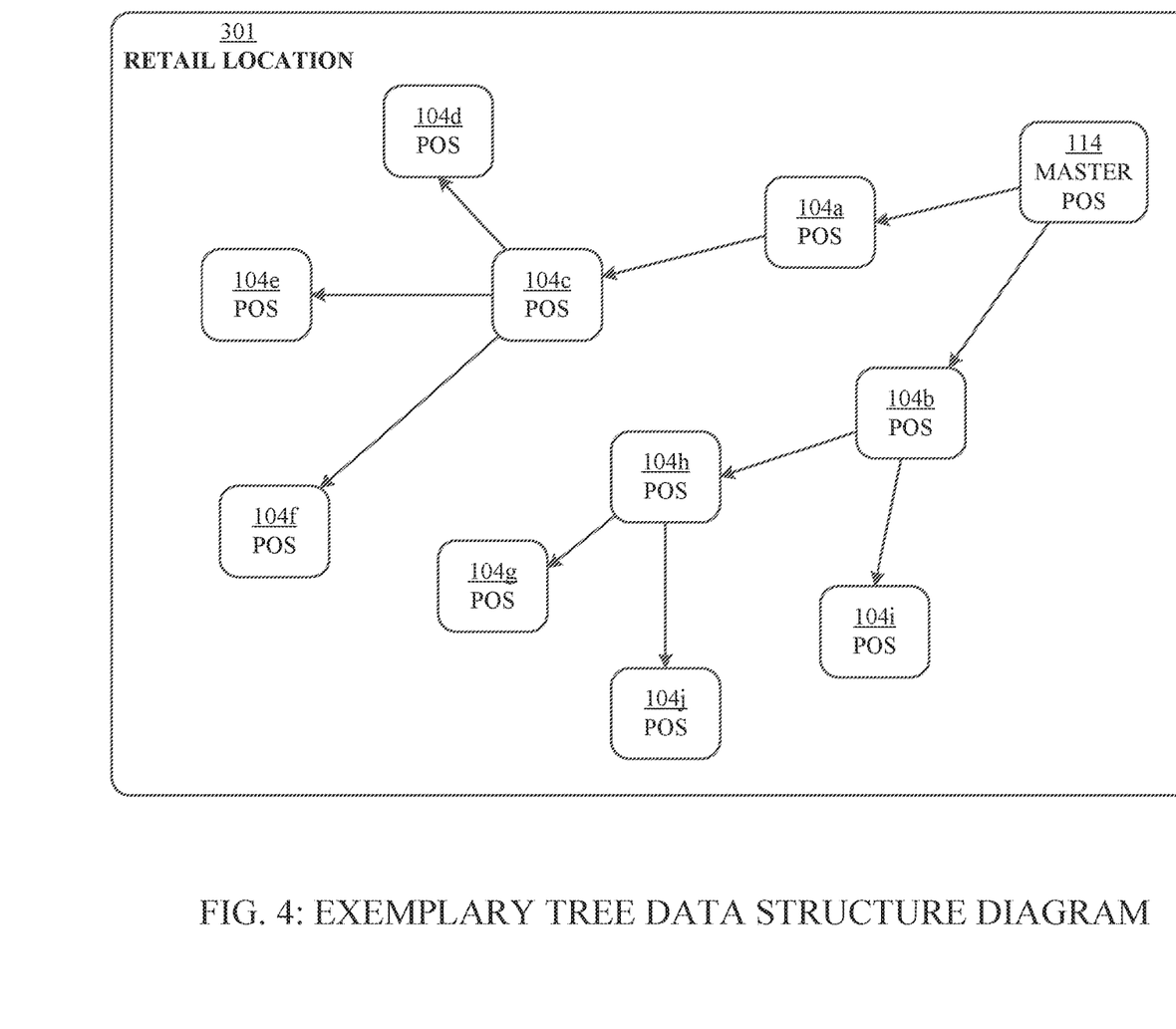
FIG. 4 illustrates an exemplary tree data structure diagram, according to one embodiment of the present disclosure.

Turning now to FIG. 4, an exemplary tree data structure diagram is shown, according to one embodiment of the present disclosure. In one embodiment, once the master data has been replicated to the master POS device 114, the master POS device may further propagate the data to all POS devices in the POS network 108. In various embodiments, the master data is transmitted between each point of sale device as if the point of sale devices were organized in a tree data structure.

For example, and as shown in FIG. 4, consider that the master POS device 114 in a retail location 301 is the root node (at the top) of the tree. Continuing with this example, the root node may have one or more nodes (POS devices 104a and 104b) below it for which the root node is responsible for transmitting data to. Furthermore, the one or more nodes (POS devices 104a and 104b) below the root node also may have one or more nodes (POS devices 104c, 104h, and 104i) below them for which they are responsible for transmitting data to. Furthermore, those one or more nodes (POS devices 104c, 104h, and 104i) may also have one or more additional nodes (POS devices 104d, 104e, 104f, 104g, and 104j) below them for which they are responsible for transmitting data to. As a result of this tree data structure, each POS device in the POS network 108 only receives the master data once, thereby reducing redundancy and increasing efficiency within the system.

In some embodiments, a gossip protocol or algorithm may be used to propagate the master data throughout the POS network 108. In one embodiment, a gossip protocol allows for nodes to receive data from a nearby node, and then transmit that data to any other nearby node. A gossip protocol is useful and effective for spreading data across a network; however, it typically promotes redundancy due to nodes transmitting data to nodes that may have already received the data. In various embodiments, the system may use any other appropriate data transmission method/algorithm.

Service Discovery

Figure 5:
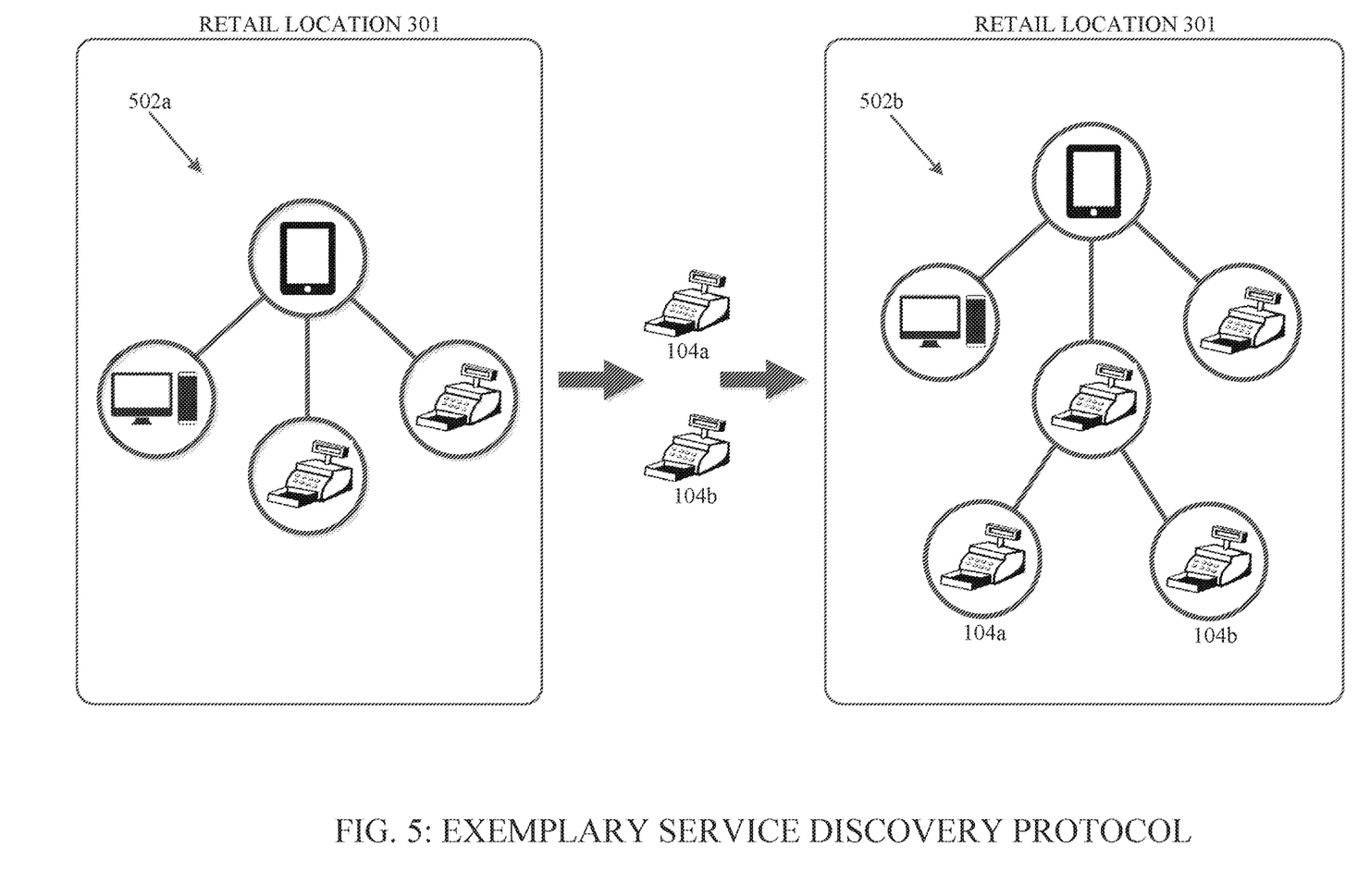
FIG. 5 illustrates an exemplary service discovery protocol, according to one embodiment of the present disclosure.

In one embodiment, the POS devices at various locations use a service discovery protocol to advertise their availability on the network and to discover their peers (other POS devices in the POS network 108). In various embodiments, service discovery allows the clients within a network to be self-organizing without having to configure each connection, and to dynamically share state with each other.

For example, FIG. 5 shows an exemplary service discovery protocol, according to one embodiment of the present disclosure. As shown in FIG. 5, retail location 301 includes a POS network 502a containing multiple POS devices. In this example, the store owner seeks to expand his business and integrate POS devices 104a and 104b into the POS network 502a. Continuing with this example, using the service discovery protocol described herein, the store owner may seamlessly integrate POS devices 104a and 104b into the existing POS network 502a, such that POS network 502b is created with zero configuration.

In particular embodiments, the service discovery capability is implemented using DNS service discovery, wherein devices and services within a network are advertised to the surrounding POS devices using standard DNS programming interfaces, servers, and packet formats. In some embodiments, software packages such as Bonjour®, developed by Apple Inc., may allow service discovery within a network. In one embodiment, a custom websocket-based cloud discovery service may allow for each POS device to broadcast information such as device state to the surrounding POS devices.

In various embodiments, service discovery typically only works over a single network segment, therefore if a network is segmented it could have multiple "swarms" of POS devices. According to various aspects of the present disclosure, service discovery is used to advertise the following information:

Service type—Used to differentiate different service types (e.g., printers, file shares) on the network.

Address—The hostname and IP address.

Service name—A unique identifier for the service which can be used to associate configuration settings or cached metadata.

Port number—The port on which the service is listening.

Group Id—Groups clients, typically by store (location), so if distinct retail locations happen to use the same physical network they won't collide.

Databases—The databases the client has made available for replication.

Role—The data sync role this client has taken on (see "Master Election" above) for each database.

Sequence—Each database's sequence number which includes a counter that increments with each database change.

Version—Identifies the version of the data sync implementation so that incompatible releases can be segregated.

Transaction Data Sync & Peer Selection (Transaction Data)

In one embodiment, transaction data synchronization and/or replication allows for data regarding information such as unposted transactions on one or more POS devices to be shared in a POS network 108, and temporarily saved on one or more POS devices if a virtual server 110 cannot be reached (i.e. offline). In various embodiments, the transaction data may be stored in a local database or memory cache at one or more POS devices. In certain embodiments, transaction data syncing adds an extra layer of resilience to reduce the chance of transactions getting lost if a POS device's storage fails or the data is erased before all transactions can be posted to the virtual server. For example, consider a retail location with two POS devices operating various business transactions. In this example, each point of sale device may share transaction data with the other device, therefore if one of the devices experiences a failure then the other device includes a record of the failed device's transaction history.

In some scenarios, a transaction may be suspended at a point of sale device (or mobile payment application on a customer's mobile device). In these scenarios, and according to one embodiment, the system may select a peer POS device and the transaction information may be sent directly to the selected peer POS device to be resumed without having to relay the data through the virtual architecture.

Figure 6:
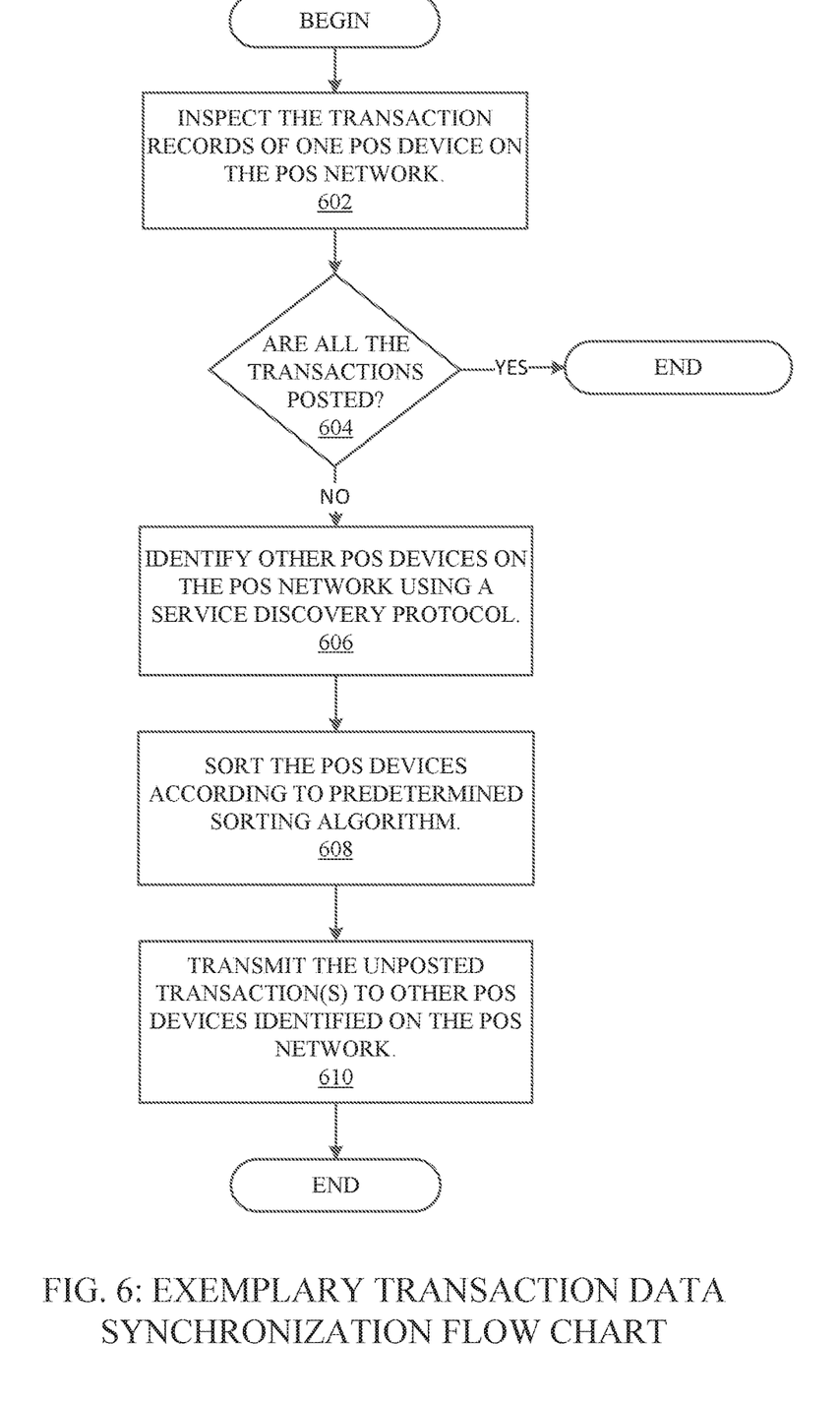
FIG. 6 illustrates an exemplary transaction data synchronization flowchart, according to one embodiment of the present disclosure.

Turning now to FIG. 6, an exemplary transaction data replication flowchart is shown, according to one embodiment of the present disclosure. In various embodiments, transaction data replication is executed by any or all POS devices 104 on a POS network 108. In particular embodiments, transaction data replication is executed by the virtual server 110. In some embodiments, transaction data replication may be executed by the last known master POS device 114 on the POS network 108.

According to various embodiments, the exemplary process begins with step 602, where the system is configured to inspect the transaction records of one POS device on the POS network 108. In various embodiments, transaction records may include, but are not limited to, total sales, employee sales, returns, customer information, inventory levels, etc.).

At step 604, the system is configured to perform a check to determine whether all the transaction records on the POS device inspected at step 602 have posted. For purposes of this discussion, a "posted transaction" is a transaction that has been finalized and can no longer be deleted or edited. In one embodiment, if all the transaction records have posted, then the process terminates.

However, in particular embodiments, if all the transaction records have not posted, then at step 606, the system is configured to identify other POS devices on the POS network 108. In various embodiments, the system identifies other POS devices using a service discovery protocol as described above in FIG. 5.

At step 608, the system sorts the POS devices in the POS network 108 according to a predetermined sorting algorithm to determine the most efficient path of data replication and/or transfer. In one embodiment, the system may sort the POS devices via a comparison sorting algorithm (e.g., merge sort, insertion sort, etc.). In another embodiment, the system may sort the devices via an integer sorting algorithm (e.g., counting sort, alphabetically according to the device identification numbers, etc.).

Finally, at step 610, the system transmits the unposted transaction(s) to the other POS devices identified on the POS network prior to process termination.

According to various aspects of the present disclosure, for transaction replication, all devices do not need to receive all transactions. In a particular embodiment, the system replicates unposted transactions to 1-N peer devices.

Peer Replication (Pull)

In one embodiment, peer replication could use either push or pull replication. In one embodiment, each POS device in the system selects a partner (its parent node in the tree) and monitors its service information (the DNS-SD TXT record) (e.g., store identifier, terminal identifier, tenant identifier, environment identifier, database sequence, port number, etc.). In various embodiments, when the POS device detects a database sequence change, it may initiate pull replication. In particular embodiments, this process may execute whenever a service change is detected and replicate with a new parent if the network topology is changed.

Peer Replication (Push)

In one embodiment, when the transaction posting component fails to post transactions to the virtual server, it initiates push replication with 1-N peer POS devices.

Server/Slave Replication

In one embodiment, if a POS device advertises itself on a network as a "server", all other POS devices may cease peer-to-peer replication and instead use pull replication with the server. In various embodiments, this makes it possible to deploy a store server when desired and the POS devices will automatically configure themselves into a hub-and-spoke topology to replicate with the newly declared server. If the store server goes down, the POS devices can switch into peer-to-peer mode and elect a master, providing resilience against a store server failure.

Mutual Authentication

In one embodiment, when a POS device is connecting to a server, the system may implement transport layer security ("TLS") server authentication to ensure that the server is trusted. In various embodiments, this process includes reliance on a trusted domain name server ("DNS") system to resolve the hostname to an address, and a trusted TLS certificate provided from the server at that address matching that hostname. In certain embodiments, TLS mutual authentication involves sending a client TLS certificate to the server, which verifies and identifies the client.

In some embodiments, mutual TLS authentication with custom verification is used, wherein information such as group ID and service name is embedded into the certificate. In one embodiment, during provisioning a POS device or other retail client, the POS device can submit a certificate signing request ("CSR") to a private virtual Certificate Authority ("CA") service and obtain a signed certificate and certificate chain it can use to present and verify credentials. In various embodiments, these certificates can be stored in the POS device's keychain. In some embodiments, a Certificate Revocation List ("CRL") may be distributed out-of-band to revoke the certificate of a POS device that has been unprovisioned or has gone missing. According to various aspects of the present disclosure, this process allows for POS devices to submit CSRs, get certificates, and can then mutually authenticate each other.

Exemplary System Advantages

In one embodiment, the system uses peer-to-peer 'zeroconf' technology for the point of sale devices to discover each other and elect a 'master'. For the purposes of this discussion, zeroconf technology is a set of technologies that automatically create a usable computer network based on the Internet Protocol Suite (TCP/IP) when devices are interconnected. In various embodiments, and for data transfer efficiency and preservation of bandwidth across the wide area network connecting the stores to the cloud, only the master receives data from the virtual architecture.

In certain embodiments, a tree algorithm allows the remaining 'peer' devices within the network to pull the new data from a neighboring point of sale device locally, without any duplication of effort.

In various embodiments, the system may detect a loss of visibility of the current master device and quickly elect a new master device. In one embodiment, if a single master device cannot be elected for any reason, the system may fail over to each device working independently until a peer relationship can be successfully established.

According to various aspects of the present disclosure, the system may handle any failure to post a completed transaction to the virtual architecture, and employ a scheme to replicate that transaction data to the one or more point of sale devices. In some embodiments, the policy for how many point of sale devices replicate each transaction allows each selling location to balance the added protection against data loss afforded by saving multiple copies, against the efficient use of the aggregate storage capacity of all the mobile devices in the store. For example, if extended outage conditions are possible, only a single redundant copy might be made of each transaction, so that the greatest number of total transactions may be stored across the device set. In particular embodiments, new transactions may be blocked from being started when storage capacity dips below a certain critical threshold, as the system must guarantee it can save each transaction at least once.

In one embodiment, the system implements security measures to properly authenticate devices before allowing them to join the network within the selling location as a participating device (i.e. as a master or peer).

Exemplary System Experimentation Results

Couchbase® Cluster

According to various embodiments, a virtual, document-oriented architecture and database system, such as a Couchbase® server, and sync gateway cluster in a virtual computing platform, such as Amazon® AWS, may be included in the system. In one embodiment, the sync gateway instances may be set up behind an elastic load balancer. In various embodiments, instances of a web service that provide secure, resizable computing capacity in the cloud (e.g., EC2, m4.xlarge) may be optimized to balance computing, memory, and network resources with persistent block storage (e.g., EBS storage). According to various aspects of the present disclosure, a time-series analytics platform (e.g., an ELK stack), may gather and report on telemetry from clients sent via a server-side data processing pipeline (e.g., a Logstash protocol).

Client

In various embodiments, a framework for developing mobile applications (e.g., React Native) may be integrated with a mobile application engine, such as Couchbase Lite® iOS, for evaluation on iOS mobile devices. In one embodiment, and in order to simulate a "swarm" of POS devices, a JavaScript run-time environment, such as a node.js application, may act as a client simulating a POS device. In a particular embodiment, the application integrated Couchbase Lite® Java may run a virtual operating system environment, such as Docker®, in a service for deploying and scaling web applications, such as Elastic Beanstalk, using its auto-scaling capability to configure the number of POS simulator workers for each test.

In a particular embodiment, the application may implement a custom scheme for replicating data from the sync gateway and also peer-to-peer between devices. Exemplary aspects of the implementation are outlined below:

- Peer Service Discovery: In one embodiment, a service discovery protocol, such as a Multicast Domain Name System ("mDNS") through Bonjour®, may be used for peer service discovery. According to various aspects of the present disclosure, since mDNS may not be a viable option for the cloud-based swarm of POS simulators, an alternative scheme may be developed where clients effectively communicate the same information via web sockets connected to a back-end service. In some embodiments, published information may include:
  - The IP address and port of the service
  - The "master" state of the service
  - The database sequence number (a value that changes whenever anything is modified in the database)
- Master Election: In one embodiment, a simple and deterministic algorithm may be used to choose which device becomes master:
  - First subscribe for peer service discovery and wait some period of time to discover the peer clients already publishing their services.
  - If no client has already declared itself master, sort the list of unique client IDs and if at the top of the list, declare itself master.
  - If multiple clients declare themselves master, then the lower-ranked ones will "resign".
  - Publish its service via the peer service discovery implementation, if its master state has changed.
  - Upon any service change notification, repeat the master selection process.
- Sync Gateway replication: In one embodiment, the "master" may initiate continuous pull replication with sync gateway. In various embodiments, when database changes are detected, the service may be republished with the updated sequence number.
- Peer-to-peer replication: In one embodiment, a fan-out algorithm may be implemented to arrange clients in a tree starting with the master node and two vertices connecting from each parent to children underneath. In various embodiments, each child node in the tree would select its parent based on this algorithm, and then initiate a one-shot pull replication with its parent when it detected a change in the parent's sequence number. In a particular embodiment, a throttling mechanism may also be used to ensure at least ten seconds pass between each replication request from a given client.

Tests

The following are POS system data replication and document insertion test results over a variety of simulated environments. The number of documents, the size of data, and the speed of the network were tested among other variables.

Test 1: Insert Documents Via Sync Gateway

In some embodiments, Bash and JavaScript scripts may be implemented to populate the Couchbase® cluster with documents using the Sync Gateway REST API. In one exemplary system test which focused on replication from the cluster to the clients, not on the performance of the data upload, the scripts were not optimized to take advantage of Couchbase's° bulk upload API, resulting in the data below:

50K 4-5 KB documents*

*Note: The documents in this test had very similar content, which made them easily compressible, skewing the amount of data sent over the wire in an unrealistic way. Later tests used a different script to generate highly random documents.

Elapsed time=726 sec
Requests/sec=68.87
Couchbase Server CPU per instance 25%-28%

Test 2: Replicate to a Master Over a Fast WAN

According to various aspects of the present disclosure, this test involves a single iOS POS client acting as master, replicating the documents from Test #1 from Sync Gateway.

Client: Macbook Pro running 1 node worker
51366 documents
WAN speed: 20 mb/s
Elapsed time: 185 sec
6.39 MB received (262.75 MB uncompressed)
2.5 MB sent
4.66 requests/sec Test 3: Replicate to a Master Over a Slow WAN According to various aspects of the present disclosure, this test involves a single iOS POS client acting as master, replicating the documents from Test #1 from Sync Gateway.

Client: MacbookPro® running 1 node worker
55037 documents
WAN speed: 256 kb/s
Elapsed time: 280 sec
6.46 MB received (264.32 MB uncompressed)
2.53 MB sent
3.06 requests/sec Test 4: Replicate to a Master Over a Slow WAN According to various aspects of the present disclosure, this test is a repeat of test #3 but with highly randomized documents that did not compress well over the wire.

Client: MacbookPro® running 1 node worker
50000 4 KB documents (very randomized)
WAN speed: 256 kb/s
Elapsed time: 5585 sec
153 MB received (220 MB uncompressed)
6.13 MB sent
0.81 requests/sec Test 5: Replicate to a Master with a Single Slave Over a Fast WAN According to various aspects of the present disclosure, this test may involve replicating all of the documents from the previous tests to a master iOS POS client with a single "slave" client that uses mDNS service discovery and P2P Couchbase Lite® pull replication from the master.

Clients: MacbookPro® running 2 node workers
105039 4-5 KB documents (mix of documents from previous tests)
WAN speed: 20 mb/s Elapsed time: 534 sec
153.84 MB received (473.28 MB uncompressed)
4.99 MB sent
3.35 requests/sec Test 6: Replicate to a Master with a Single Slave Over a Fast WAN with Master/Slave Transitions In at least one embodiment, this test may be a repeat of test 5, but may force the clients to switch between master and client by periodically killing and restarting whichever one was master. In one embodiment, the master-slave switch was forced seven times during the test.

Clients: MacbookPro® running 2 node workers
105039 4-5 KB documents (mix of documents from previous tests)
WAN speed: 20 mb/s
Elapsed time: 648 sec
186.66 MB received (599.31 MB uncompressed)
13.07 MB sent
3.69 requests/sec Compared to the previous test, switching masters did increase the overall time, number of requests, and amount of data sent over the wire. However, performance was not greatly affected and both clients received all documents despite the applications being randomly terminated during replication.

Test 7: Replicate Data to 60 New POS Clients Added at a Store

In one embodiment, this test simulates 60 new clients being switched on with one as the elected master replicating from sync-gateway and p2p replication to the other 59.

Clients: 20 m3.large instances running 3 node client workers each
105039 documents, 4-5 KB each
Elapsed time: 11½ minutes Test 8: Upload 1.08M Documents to Couchbase® Cluster In one embodiment, a script may be developed to use the Couchbase® Sync Gateway REST API* to upload documents. According to various aspects of the present disclosure, the script may be configured to create 80% of the documents on a "common" channel that would be received by all stores, and the other 20% on channels unique per store. In a particular embodiment, about 100K documents per store were created (~4 KB each), which amounted to a total of 1.08M documents, or 4.32 GB of raw data.

*Note: This script did not take advantage of the Couchbase® bulk upload API, which would likely greatly improve insert performance.

1.08M documents (~4 KB each), 4.32 GB of raw data.
Elapsed time: 106 minutes

Test 9: Replicate Data to 50 POS Clients at 50 Different Stores

In one embodiment, using the 1.08M documents seeded in the Couchbase® cluster, 50 node POS client simulators were started to test replication via sync gateway to 50 stores. This is effectively simulating a scenario of bringing new 50 stores online simultaneously.

100K documents per store, 80% common, 20% unique per store, total of 1.08M documents
Clients: t2.micro with 1 worker each
Elapsed time: 10.5 minutes Test 10: Replicate New Data to 50 Connected Stores According to one embodiment, in this test a simple script was used to upload 540,000 documents, with 40,000 common to all stores and the rest 10,000 unique for each of 50 stores. There were 50 node POS simulator clients running and connected to sync-gateway while the documents were uploading.

50K documents per store, 80% common and 20% unique, total of 540K documents
Clients: t2.micro with 1 worker each
Elapsed time: 58 minutes*

*The elapsed time was constrained by the simplistic upload script that uploads a single document per REST API request.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A system for facilitating data communication between point of sale (POS) devices, comprising:

a plurality of POS devices deployed at a retail location and operative to process transactions relating to purchase of goods/services at the retail location, wherein one of the plurality of POS devices comprises a master POS device that coordinates transaction data corresponding to the purchase of goods/services from the plurality of POS devices to a central server located at a disparate physical location from the retail location, and further wherein the plurality of POS devices are self-organized, whereby each of the plurality of POS devices dynamically share their statuses; and the central server operative to communicate with the master POS device, wherein the master POS device is designated from the plurality of POS devices via a master election algorithm, the master election algorithm comprising the following steps:

retrieving one or more preferences corresponding to election of the master POS device, wherein the one or more preferences define operational and/or network characteristics appropriate for the master POS device;

scanning each of the plurality of POS devices according to a predefined sorting algorithm to identify at least one POS device that has a respective status indicating it is available to become the master POS device and has operational and/or network characteristics matching the one or more preferences; and designating the at least one POS device as the master POS device.

2. The system of claim 1, wherein the central server is operative to receive transaction data from the master POS device.

3. The system of claim 1, wherein the master POS device is operable to receive data from the central server, stores it in local memory within the master POS device, and propagate it to the plurality of POS devices.

4. The system of claim 1, wherein each of the plurality of POS devices has installed thereon a software agent comprising an HTTP listener that detects data updates within any of the plurality of POS devices.

5. The system of claim 1, wherein each of the plurality of POS devices replicates its respective transaction data to at least one other POS device for purposes of data redundancy.

6. The system of claim 5, wherein data replication is performed during an offline mode when at least one of the plurality of POS devices is disconnected from a network connection.

7. The system of claim 1, wherein the plurality of POS devices are organized into a hierarchical tree structure of devices comprising the master POS device at a root of the tree structure, whereby data is propagated and replicated along the tree structure.

8. The system of claim 1, wherein each of the plurality of POS devices is able to communicate with all POS devices in the plurality of POS devices.

9. The system of claim 1, wherein the one or more preferences corresponding to election of the master POS device are selected from the group comprising: available bandwidth, available storage memory, network connection strength, processing capabilities, age of device, device type.

10. The system of claim 1, wherein the plurality of POS devices are selected from the group comprising: cash registers, tablet computers, desktop computers, smartphones, and/or any of the foregoing having a dongle that enables payment transaction processing.

* * * * *